US012578221B2

(12) United States Patent
Okabe et al.

(10) Patent No.: US 12,578,221 B2
(45) Date of Patent: Mar. 17, 2026

(54) WEIGHING APPARATUS CONFIGURED TO CALCULATE FAILURE RISK, AND INSPECTION CONTENT PROPOSING METHOD OF THE SAME

(71) Applicant: A&D COMPANY, LIMITED, Tokyo (JP)

(72) Inventors: Kazuna Okabe, Saitama (JP); Yoshikazu Nagane, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 405 days.

(21) Appl. No.: 18/029,580

(22) PCT Filed: Oct. 2, 2020

(86) PCT No.: PCT/JP2020/037535
§ 371 (c)(1),
(2) Date: Mar. 30, 2023

(87) PCT Pub. No.: WO2022/070403
PCT Pub. Date: Apr. 7, 2022

(65) Prior Publication Data
US 2023/0366723 A1     Nov. 16, 2023

(51) Int. Cl.
*G01G 23/01* (2006.01)
*G01G 7/02* (2006.01)
(52) U.S. Cl.
CPC ............... *G01G 23/01* (2013.01); *G01G 7/02* (2013.01)
(58) Field of Classification Search
CPC ......... G01G 23/005; G01G 23/01; G01G 7/02
See application file for complete search history.

(56) References Cited

U.S. PATENT DOCUMENTS 6,995,323 B2 * 2/2006 Kunzi .................. G01G 23/002
                                                        702/101
9,638,756 B2 * 5/2017 Srinivasan ............. G01R 31/36
                        (Continued)

FOREIGN PATENT DOCUMENTS

EP         3372963 A1 * 9/2018  ............. G01G 23/01
JP    2007-139768 A    6/2007
                        (Continued)

OTHER PUBLICATIONS

International Search Report and Written Opinion issued in corresponding Application No. PCT/JP2020/037535 on Dec. 8, 2020; 8 pages.

*Primary Examiner* — Natalie Huls
(74) *Attorney, Agent, or Firm* — Studebaker Brackett PLLC

(57) ABSTRACT

Provided is a weighing apparatus and a method capable of quantifying a failure risk based on an impact load and proposing an inspection content according to an impact. In order to achieve the object described above, a weighing apparatus includes a weighing sensor, an impact load quantifying unit configured to quantify an impact load from an acceleration of a load transmitting unit configured to transmit a load of a weighing object to the weighing sensor, and a failure risk level calculating unit configured to calculate an impact level based on a numerical value of the impact load, and calculate a failure risk level from the number of detections of the impact level in a predetermined period of time from past to present and a weighting coefficient according to the impact level.

10 Claims, 8 Drawing Sheets

(56)　　　　　References Cited

U.S. PATENT DOCUMENTS

| | | | | |
|---|---|---|---|---|
| 12,276,539 B2 * | 4/2025 | Yang | .................. | G05B 23/0235 |
| 2002/0066602 A1 * | 6/2002 | Bliss | .................. | G01G 23/3735 |
| | | | | 177/25.13 |
| 2007/0119226 A1 | 5/2007 | Tellenbach et al. | | |
| 2010/0004876 A1 * | 1/2010 | Loher | .................... | G01G 23/01 |
| | | | | 702/41 |
| 2012/0029839 A1 * | 2/2012 | Ritter | ................. | G05B 23/0283 |
| | | | | 702/34 |
| 2014/0332290 A1 * | 11/2014 | Izumo | ...................... | G01G 7/02 |
| | | | | 177/1 |

FOREIGN PATENT DOCUMENTS

| | | | |
|---|---|---|---|
| JP | 2011-179960 A | 9/2011 | |
| JP | 2013-124922 A | 6/2013 | |
| JP | 2015-40810 A1 | 3/2015 | |
| JP | 5839975 B | 11/2015 | |
| JP | 6151132 B | 6/2017 | |

* cited by examiner

<u>1</u>   Weighing apparatus (first embodiment)

1

START

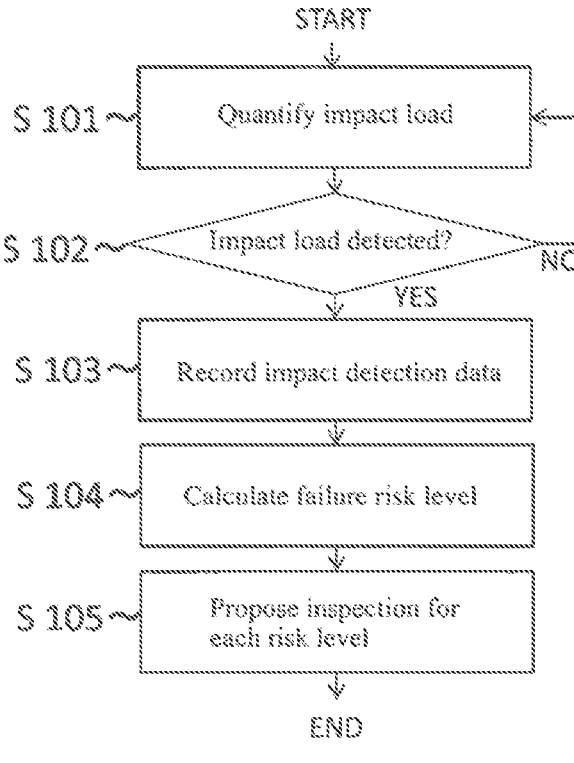

S 101 — Quantify impact load

S 102 — Impact load detected?          NO

YES

S 103 — Record impact detection data

S 104 — Calculate failure risk level

S 105 — Propose inspection for each risk level

END

FIG. 3

| Impact level | Weighting coefficient (initial value) | Description |
|---|---|---|
| 1 | 0.05 | Increase risk level by 1 per 20 detections of impact level 1 |
| 2 | 0.12 | Increase risk level by 1 per 8 detections of impact level 2 |
| 3 | 0.24 | Increase risk level by 1 per 4 detections of impact level 3 |
| 4 | 0.50 | Increase risk level by 1 per 2 detections of impact level 4 |

FIG. 4

| Impact level | Number of impact detections N |
|---|---|
| 1 | 20 |
| 2 | 10 |
| 3 | 7 |
| 4 | 5 |

FIG. 5

| Failure risk level of balance | Judgment | Inspection content |
|---|---|---|
| 1~3 | Safe | None |
| 4~6 | Attention 1 | Calibration |
| 7~8 | Attention 2 | Calibration Repeatability check |
| 9~10 | Danger | Calibration Repeatability check Linearity check Eccentricity error check |

<u>1</u> Weighing apparatus (second embodiment)

| Impact level | Calculation formula |
|:---:|:---:|
| 1 | $C_1 = B \times K_1 = 0.25 \times 0.05 = 0.0125$ |
| 2 | $C_2 = B \times K_2 = 0.25 \times 0.12 = 0.03$ |
| 3 | $C_3 = B \times K_3 = 0.25 \times 0.24 = 0.06$ |
| 4 | $C_4 = B \times K_4 = 0.25 \times 0.50 = 0.125$ |

| Impact level | Calculation formula |
|:---:|:---:|
| 1 | $K_1' = K_1 + C_1 = 0.05 + 0.0125 = 0.062$ |
| 2 | $K_2' = K_2 + C_2 = 0.12 + 0.03 = 0.15$ |
| 3 | $K_3' = K_3 + C_3 = 0.24 + 0.06 = 0.3$ |
| 4 | $K_4' = K_4 + C_4 = 0.50 + 0.125 = 0.625$ |

1 Weighing apparatus (fourth embodiment)

WEIGHING APPARATUS CONFIGURED TO CALCULATE FAILURE RISK, AND INSPECTION CONTENT PROPOSING METHOD OF THE SAME

TECHNICAL FIELD

The present invention relates to a weighing apparatus that weighs a weighing object by a weighing sensor, particularly, to a weighing apparatus capable of evaluating an impact load applied to the apparatus.

BACKGROUND ART

As this type of weighing apparatus, there are weighing apparatuses disclosed in Patent Literatures 1 and 2. The weighing apparatus disclosed in Patent Literature 1 stores an excessively large load signal and a date and time for which the excessively large load signal appeared out of load signals from a weighing sensor, so that an impact load history can be observed. The weighing apparatus disclosed in Patent Literature 2 was made by the applicant, and is configured so that displacement of an internal structure of the apparatus when the weighing sensor is applied with an impact load is converted into a numerical value of acceleration, and the degree of impact is calculated based on this acceleration, so that the impact load can be quantified.

CITATION LIST

Patent Literatures

Patent Literature 1: Japanese Patent No. 6151132
Patent Literature 2: Japanese Patent No. 5839975

SUMMARY OF INVENTION

Technical Problem

However, the weighing apparatus disclosed in Patent Literature 1 was limited to observation of an impact load history. With the weighing apparatus disclosed in Patent Literature 2, quantifying an impact load made it easier to convey the degree of impact applied to the weighing sensor to a user, but as to how high a failure risk based on the impact load is and whether to take measures after the impact load is applied, it is not yet possible to make a proposal to the user.

The present invention was made in view of the problems in the conventional techniques, and an object thereof is to provide a weighing apparatus capable of quantifying a failure risk based on an impact load and proposing an inspection content according to an impact by applying an impact load quantification technique.

Solution to Problem

In order to solve the problems described above, a weighing apparatus according to an aspect of the present invention includes a weighing sensor, an impact load quantifying unit configured to quantify an impact load from an acceleration of a load transmitting unit configured to transmit a load of a weighing object to the weighing sensor, and a failure risk level calculating unit configured to calculate an impact level based on a numerical value of the impact load, and calculate a failure risk level from the number of detections of the impact level in a predetermined period of time from past to present and a weighting coefficient according to the impact level.

In the aspect described above, it is also preferable that the weighing apparatus includes an inspection proposing unit configured to propose an inspection according to a magnitude of the failure risk level to a user.

In the aspect described above, it is also preferable that the weighing apparatus further includes a failure risk level correcting unit configured to adjust the magnitude of the weighting coefficient according to a change in repeatability related to the weighed value.

In the aspect described above, it is also preferable that the weighing apparatus further includes a failure risk level wait-and-see unit configured to judge whether a wait-and-see period has elapsed after execution of the proposal, and configured not to present a proposal by the inspection proposing unit during the wait-and-see period.

In the aspect described above, it is also preferable that the weighing apparatus further includes a daily/periodic inspection adjusting unit configured to judge whether a current date and time are a daily inspection date and time and a periodic inspection date and time, and when the current date and time are the daily inspection date and time and not the periodic inspection date and time, present a proposal by the inspection proposing unit.

In the aspect described above, it is also preferable that the failure risk level calculating unit is configured to calculate the failure risk level R from a numerical formula (1).

In the aspect described above, it is also preferable that the failure risk level correcting unit is configured to adjust the weighting coefficient (K) from a numerical formula (2) and a numerical formula (3).

Further, in order to solve the problems described above, an inspection content proposing method according to an aspect of the present invention includes the steps of: quantifying an impact load from an acceleration of a load transmitting unit configured to transmit a load of a weighing object to a weighing sensor, calculating an impact level based on a numerical value of the impact load and calculating a failure risk level from the number of detections of the impact level in a predetermined period of time from past to present and a weighting coefficient according to the impact level, and proposing an inspection content according to a magnitude of the failure risk level to a user.

Advantageous Effects of Invention

According to the present invention, a failure risk based on an impact load can be quantified, and an inspection content according to the risk can be proposed.

BRIEF DESCRIPTION OF DRAWINGS

FIG. 3 is a flowchart of an inspection content proposing method according to the first embodiment.

FIG. 4 illustrates an example of a weighting coefficient definition table.

FIG. 5 illustrates an example of impact detection data.

DESCRIPTION OF EMBODIMENTS

Next, preferred embodiments of the present invention will be described with reference to the drawings.

First Embodiment (Apparatus Configuration)

Figure 1:
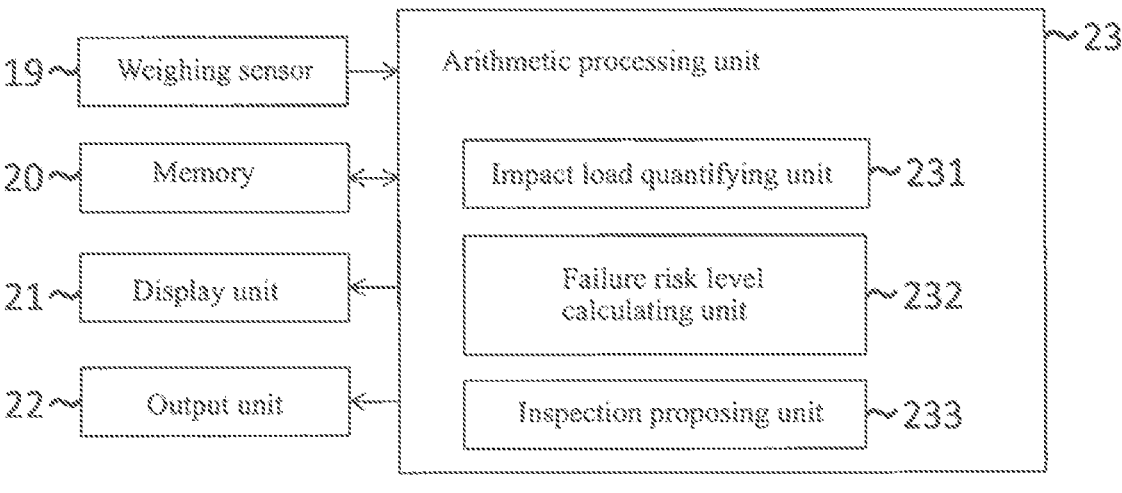
FIG. 1 is a block diagram of a weighing apparatus according to a first embodiment of the present invention.

FIG. 1 is a block diagram of a weighing apparatus 1 according to a first embodiment. The weighing apparatus 1 includes a weighing sensor 19, a memory 20, a display unit 21, an output unit 22, and an arithmetic processing unit 23.

Figure 2:
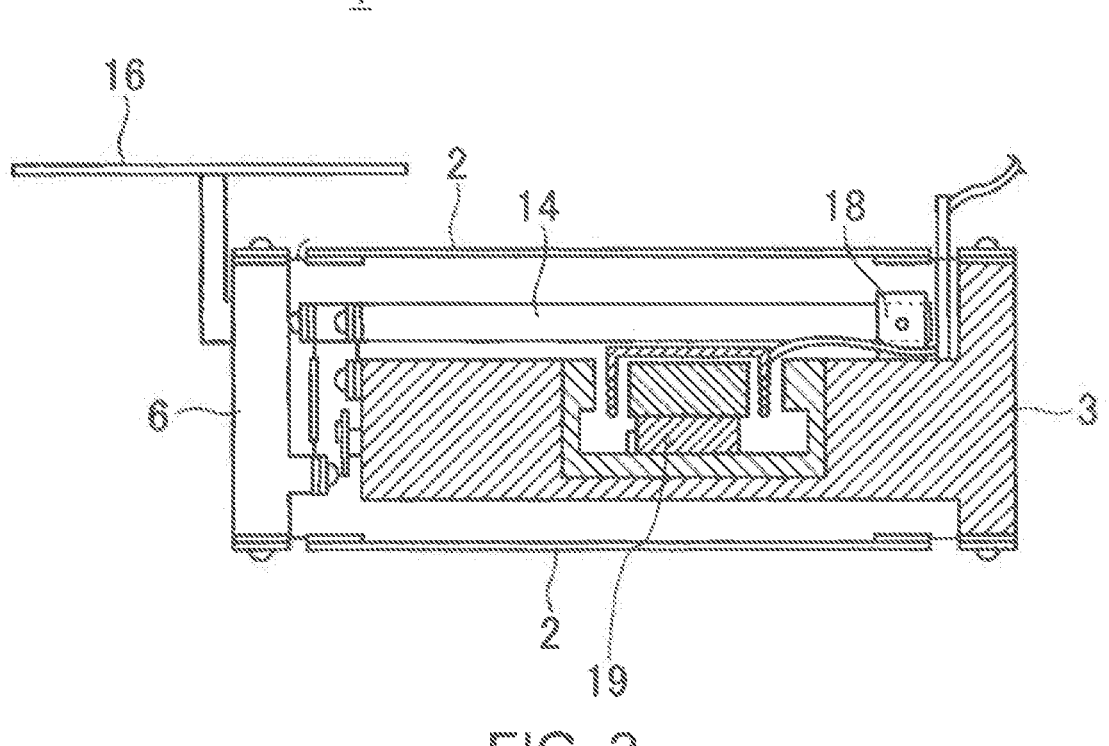
FIG. 2 is a longitudinal sectional view of the same weighing apparatus.

The weighing sensor 19 is, for example, an electromagnetic balance type sensor. FIG. 2 illustrates an example of an apparatus configuration of the weighing apparatus 1, described in detail for explanation of impact load quantification to be described later. FIG. 2 is a longitudinal sectional view of the weighing apparatus 1. The weighing apparatus 1 includes a Roberval mechanism including sub-rods 2, a fixed portion 3, and a movable portion 6. The weighing sensor 19 generates an electromagnetic force by an electromagnet disposed inside a yoke provided in the fixed portion 3 and a coil above the electromagnet. A bobbin around which a coil is wound is fixed to a beam (load transmitting unit 14), and the beam 14 turns about a fulcrum as a support bearing connected to the fixed portion. The beam 14 is connected to the movable portion 6 via a tension bearing, and is displaced by accompanying the movable portion 6.

A weighing pan 16 is joined to the movable portion 6. When a weighing object is placed on the weighing pan 16, its load is transmitted to the movable portion 6, and transmitted to the beam 14 while being guided by the Roberval mechanism, and the beam 14 is displaced correspondingly to the load on the pan. Such displacement is detected by a displacement detection sensor 18 configured by an infrared LED and a photodiode, and the weighing sensor 19 supplies a current to the coil so as to generate an electromagnetic force in a direction to cancel the displacement (a direction to reach an original equilibrium state before the load is applied) from an output voltage of the displacement detection sensor 18.

The memory 20 is a storage medium such as a memory card or HDD. In the memory 20, various programs for arithmetic operations of the arithmetic processing unit 23 are stored, and a weighed value calculated by the arithmetic processing unit 23 and a date and time for which the weighed value was acquired are recorded. In the memory 20 of the present embodiment, impact detection data, data on a weighting coefficient K, data on a failure risk level R, and information on inspection content, which are described later, are further stored.

The display unit 21 is connected to the arithmetic processing unit 23, and is provided on a front side surface of a main body case (not illustrated) of the weighing apparatus 1. The display unit 21 is a touch panel type liquid crystal image screen, and various operations can be performed from keys displayed on the display unit 21. On the display unit 21, a "failure risk level" and an "inspection content" corresponding to the failure risk level, described later, are displayed.

The output unit 22 is an RS-232C connector and/or USB connector, and is provided on a left/right side surface or a rear side surface of the main body case of the weighing apparatus 1. A failure risk level obtained by the weighing apparatus 1 and an inspection content corresponding to the failure risk level can be output to an external apparatus, for example, a personal computer, a USB memory, or a printer through the output unit 22.

The arithmetic processing unit 23 is a microcontroller configured by mounting, for example, a CPU, a ROM, and a RAM, etc., on an integrated circuit. The arithmetic processing unit 23 calculates a weighed value of the weighing object by converting a current value applied to the coil by the weighing sensor 19 into a weight. Further, in the present embodiment, the arithmetic processing unit 23 includes an impact load quantifying unit 231, a failure risk level calculating unit 232, and an inspection proposing unit 233. Functions of these will be described in detail in an inspection content proposing method to be described next.

(Inspection Content Proposing Method)

FIG. 3 is a flowchart of an inspection content proposing method using the weighing apparatus according to the first embodiment.

When the weighing apparatus 1 starts weighing, the processing shifts to Step S101, and the impact load quantifying unit 231 quantifies an impact load. The impact load quantifying unit 231 quantifies an output voltage of the displacement detection sensor 18, and converts this voltage data into "displacement amount data" corresponding to the voltage data, and by second-order differentiation of this displacement amount data, calculates "acceleration data." Then, this acceleration is regarded as corresponding to an impact applied to the weighing sensor 19, and this acceleration data is detected as "impact load." Concerning the calculation of acceleration data, like the configuration illustrated in FIG. 2, where there is a configuration to cause displacement by mass×acceleration of gravity applied as a load when a weighing object is placed on the weighing pan, the acceleration data can be calculated in the same manner, so that the weighing sensor 19 is not limited to the electromagnetic balance type, and may be a load-cell type or a capacitive type, etc.

As the processing shifts to Step S102, the failure risk level calculating unit 232 functions. The failure risk level calculating unit 232 calculates an impact level (divided into multiple levels) based on a magnitude (numerical value) of the impact load of Step S101. In this example, the impact level is divided into "0, 1, 2, 3, and 4." Concerning the impact level, a range of level 0 is determined with reference to a value when, for example, a weighing object is statically placed, and a value higher than this range is set as level 1. When the impact level is "0," the processing returns to Step S101 and weighing is continued. On the other hand, when an impact level "1" or higher is detected, the processing shifts to Step S103, and the magnitude of the impact level and a date and time for which the impact occurred are recorded as impact detection data in the memory 20.

Next, the processing shifts to Step S104, and the failure risk level calculating unit 232 totals impact detection data in a predetermined period of time from past to present, and calculates a failure risk level R of the weighing apparatus 1 from a numerical formula (1):

$$R = \sum_{r=1}^{r=n} \left( \sum_{T-t}^{T} (N \times K) \right)$$ [Numerical Formula 1]

wherein K is a weighting coefficient, N is the number of detections of impact detection data, r is an impact level, n is a maximum value of the impact level, T is a current date and time, and t is the predetermined period of time. FIG. 4 illustrates an example of a definition table of the weighting coefficient K. As illustrated in FIG. 4, a value of the weighting coefficient K is set in proportion to the magnitude of the impact level, and is defined for each impact level so that the failure risk level R is counted up by "+1" per a prescribed number of detections. FIG. 4 illustrates an example, and the value of K and the definition of counting-up may be suitably set according to the resolution and weighing capacity of the weighing apparatus.

A calculation example of the failure risk level R is shown. For example, on the assumption that the impact detection data for 2 weeks from past to present is as illustrated in the table of FIG. 5, by using the definition in FIG. 4, the failure risk level R is calculated as follows:

$$R = (N1 \times K1) + (N2 \times K2) + (N3 \times K3) + (N4 \times K4) = (20 \times 0.05) + (10 \times 0.12) + (7 \times 0.24) + (5 \times 0.5) = 6.4,$$

wherein N1 to N4 are the numbers of impact detections for the respective impact levels, and K1 to K4 are weighting coefficients for the respective impact levels.

After rounding this off, the failure risk level R=6.

Figures 6, 7:
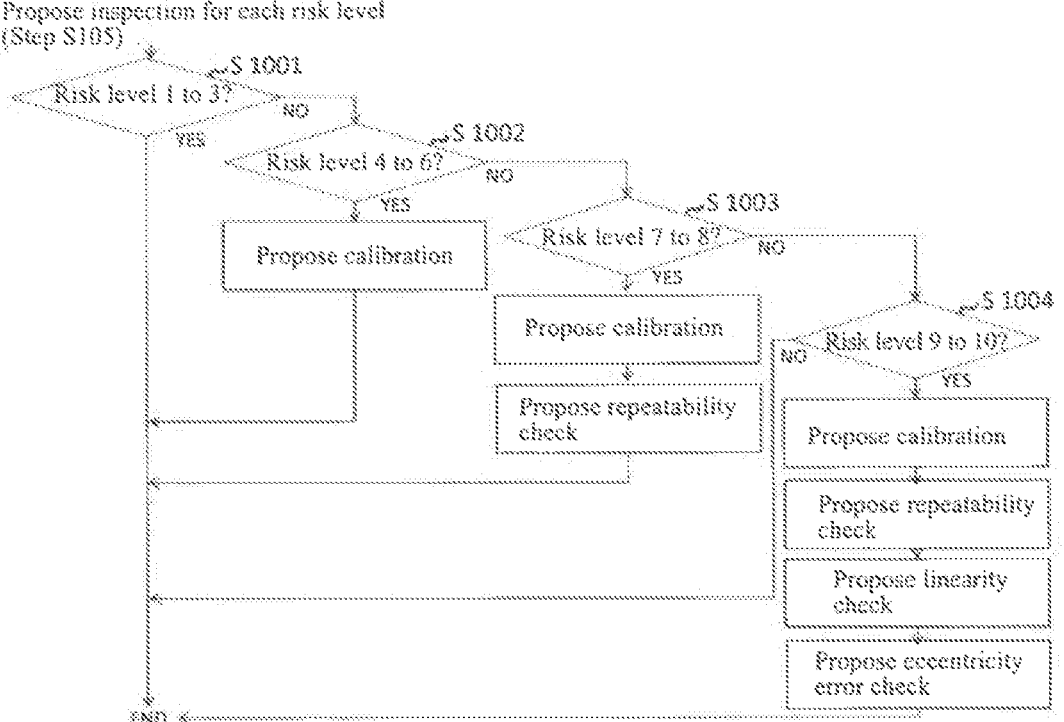
FIG. 6 illustrates an example of a correspondence table between failure risk levels and inspection content.
FIG. 7 is a flowchart for making a proposal according to a failure risk level when following FIG. 6.

Next, the processing shifts to Step S105, and the inspection proposing unit 233 functions. Based on a magnitude of the failure risk level R, the inspection proposing unit 233 proposes an inspection content according to the risk level to a user. FIG. 6 illustrates an example of a correspondence table between the failure risk levels and the inspection content. As illustrated in FIG. 6, a failure risk level R is assigned with a judgement, and for each judgment, inspection content which a user is prompted to execute are set to be different. In the example in FIG. 6, the failure risk level R is categorized into categories "1 to 3," "4 to 6," "7 to 8," and "9 to 10," and to the respective categories, judgments "Safe," "Attention 1," "Attention 2," "Danger" are assigned. In the example in FIG. 6, setting is made so that, in the case of "Safe," no proposal is presented, in the case of "Attention 1," calibration is proposed, and in the case of "Attention 2," a repeatability check is proposed in addition to calibration, and in the case of "Danger," an inspection (calibration, a repeatability check, a linearity check, and an eccentricity error check) comparable to a periodic inspection is proposed. FIG. 6 illustrates an example, and the risk level categorization and inspection content may be suitably set according to the resolution, weighing capacity, and usage environment of the weighing apparatus.

FIG. 7 is a flowchart example for making a proposal according to the failure risk level R (in step S105 in FIG. 3 when following the setting in FIG. 6). First, in Step S1001, the inspection proposing unit 233 judges whether the value of the failure risk level R is "1 to 3 (Safe)." In the case of "YES," no proposal is made. In the case of "NO," the processing shifts to Step S1002, and whether the value of the failure risk level R is "4 to 6 (Attention 1)" is judged. In the case of "YES," a proposal to perform calibration is made. In the case of "NO," the processing shifts to Step S1003, and whether the value of the failure risk level R is "7 to 8 (Attention 2)" is judged. In the case of "YES," a proposal to perform calibration is made, and a proposal to perform a repeatability check is further made. In the case of "NO," the processing shifts to Step S1004, and whether the value of the failure risk level R is "9 to 10 (Danger)" is judged. In the case of "YES," a proposal to perform calibration, a repeatability check, and further, a linearity check, and an eccentricity error check is made. When a user executes the proposed content, the inspection proposing unit 233 stores an executed item, an execution date and time, and results thereof in the memory 20.

Figure 8:
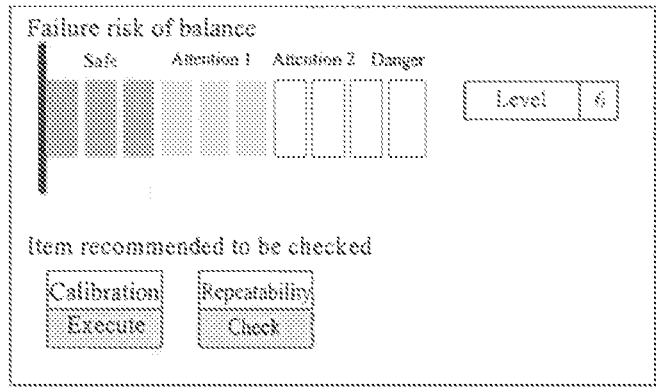
FIG. 8 illustrates a display example of a proposal according to a failure risk level.
Figure 9:
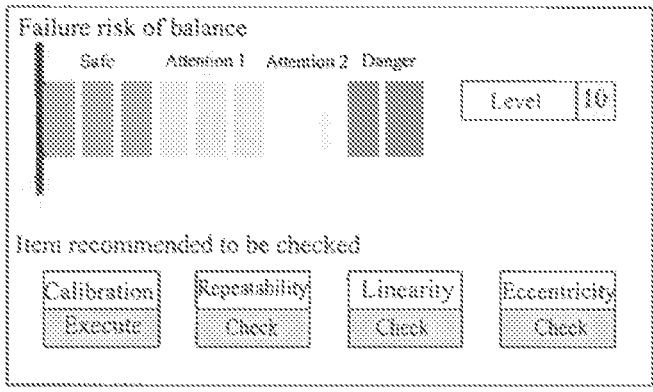
FIG. 9 illustrates a display example of a proposal according to a failure risk level.

FIGS. 8 and 9 are display examples of proposals according to the failure risk levels R. FIG. 8 illustrates a display when the failure risk level R is judged to be "6" in the flow in FIG. 7. On the display unit 21, the numerical value "6" of the failure risk level R and execution buttons for checking "calibration" and "repeatability" as its inspection content are displayed. FIG. 9 illustrates a display when the failure risk level R is judged to be "10" in the flow in FIG. 7. On the display unit 21, the numerical value "10" of the failure risk level R and execution buttons for checking "calibration," "repeatability," "linearity," and "eccentricity error" as its inspection content are displayed. It is also preferable that the failure risk level R is displayed in a visually appealing manner, for example, "Safe" is displayed in green, "Attention 1" is displayed in yellow, "Attention 2" is displayed in orange, and "Danger" is displayed in red.

As above, by using the weighing apparatus 1 of the present embodiment, a failure risk level R is calculated according to the magnitude and frequency of an impact level based on quantification of an impact load, and is quantified and disclosed to a user. Then, according to the failure risk level R, inspection content that should be executed for securing the weighing accuracy is proposed by the weighing apparatus 1. Therefore, the user can know how high the failure risk based on a current usage of the weighing apparatus is, and at the same time, the user is presented with what to do, and is guided so as to execute an inspection responding to this.

Second Embodiment (Apparatus Configuration)

Figure 10:
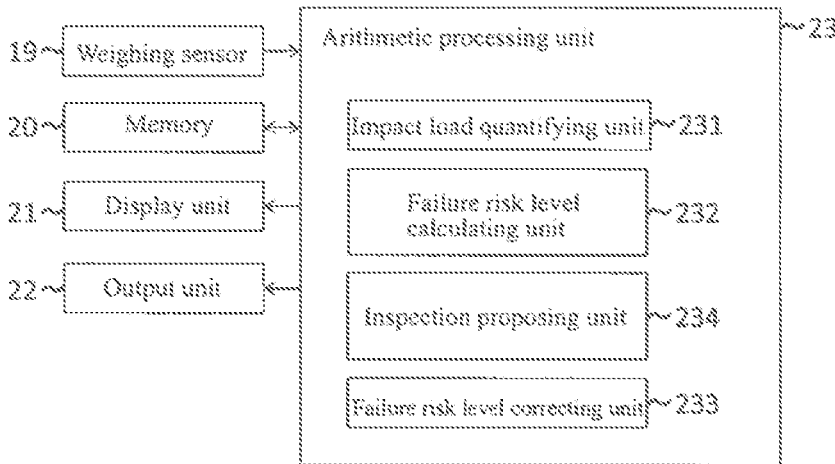
FIG. 10 is a configuration block diagram of a weighing apparatus according to a second embodiment of the present invention.

FIG. 10 is a configuration block diagram of a weighing apparatus 1 according to a second embodiment. The same configuration as in the first embodiment is provided with the same reference sign, and description thereof will be omitted. The weighing apparatus 1 of the present embodiment includes the weighing sensor 19, the memory 20, the display unit 21, the output unit 22, and the arithmetic processing unit 23, and further, the arithmetic processing unit 23 includes a failure risk level correcting unit 234.

"Repeatability (standard deviation)" related to a weighed value is a barometer of the weighing accuracy, and when the repeatability deteriorates, the failure risk of the apparatus also increases.

The failure risk level correcting unit 234 causes the arithmetic processing unit 23 to periodically calculate the repeatability of the weighed value, and stores the calculation result in the memory 20 together with a calculation date and time. According to a change in "repeatability," the failure risk level correcting unit then adjusts the value of the "weighting coefficient K" that influences calculation of the failure risk level R.

The failure risk level correcting unit 234 adjusts the weighting coefficient K by using a numerical formula 2:

$$K=K+C \qquad \text{[Numerical formula 2]}$$

wherein, C is an adjustment amount of the weighting coefficient, and is obtained according to a numerical formula 3 by using a repeatability change rate B.

$$C=B \times K \qquad \text{[Numerical formula 3]}$$

The repeatability change rate B can be obtained as:

$B$=(Current repeatability measurement value−Previous repeatability measurement value)/Previous repeatability measurement value (Inspection Content Proposing Method)

Figures 11, 12, 13:
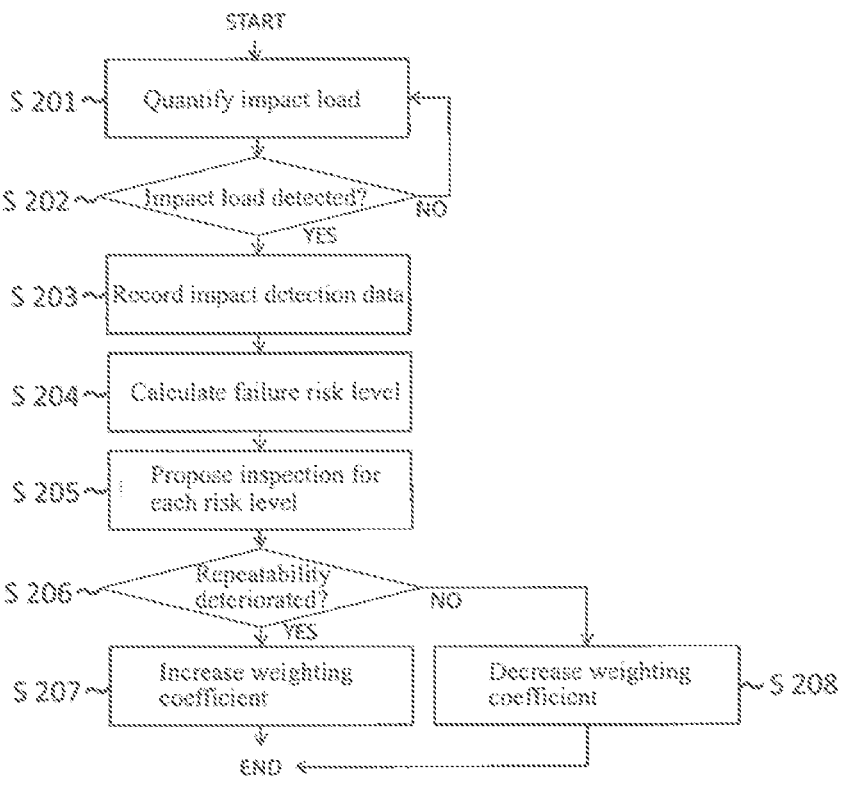
FIG. 11 is a flowchart of an inspection content proposing method according to the second embodiment.
FIG. 12 illustrates a calculation example of an adjustment amount.
FIG. 13 illustrates a correction example of a weighting coefficient.

FIG. 11 is a flowchart of an inspection content proposing method according to the second embodiment.

Steps S201 to S205 are the same as Steps S101 to S105 of the first embodiment. That is, the impact load quantifying unit 231 quantifies an impact load in Step S201, the failure risk level calculating unit 232 calculates an impact level in Step S202, and accumulates impact detection data in Step S203. Then, after a predetermined period of time elapses, the processing shifts to Step S204, and the failure risk level calculating unit 232 calculates a failure risk level R, and in Step S205, the inspection proposing unit 233 proposes an inspection content according to the risk level to a user.

In the present embodiment, as the user executes an inspection of the repeatability following the proposal made in Step S205, the processing shifts to Step S206. In Step S206, the failure risk level correcting unit 234 functions and reads the previous repeatability measurement value from the memory 20, and compares the current repeatability measurement value inspected by the user in Step S205 to the previous value. When the repeatability is found to have deteriorated, the processing shifts to Step S207, and the failure risk level correcting unit 234 performs a correction to increase the weighting coefficient K stored in the memory 20. On the other hand, when the repeatability is found to have been improved, the processing shifts to Step S208, and the failure risk level correcting unit 234 performs a correction to decrease the weighting coefficient K.

A correction example of the weighting coefficient K is shown. For example, it is assumed that the previously measured repeatability is σ=1.2, whereas the currently measured repeatability is σ=1.5. The repeatability has increased by 0.3 compared to the previous value, and is found to have deteriorated. In this case, the repeatability change rate B is:

$B$=(Current repeatability measurement value−Previous repeatability measurement value)/Previous repeatability measurement value=(1.5−1.2)/1.2=0.25

When the current weighting coefficient K is as illustrated in FIG. 4, the failure risk level correcting unit 234 reads weighting coefficients K1 to K4 for the respective impact levels from the memory 20, and by using the numerical formula 3, calculates adjustment amounts C1 to C4 as illustrated in FIG. 12. Subsequently, by using the numerical formula 2, the failure risk level correcting unit 234 corrects the weighting coefficients K1 to K4 as illustrated in FIG. 13. Then, from the next impact detection, the failure risk level correcting unit 234 calculates the failure risk level R by using the corrected weighting coefficients K1' to K4'.

Figure 14:
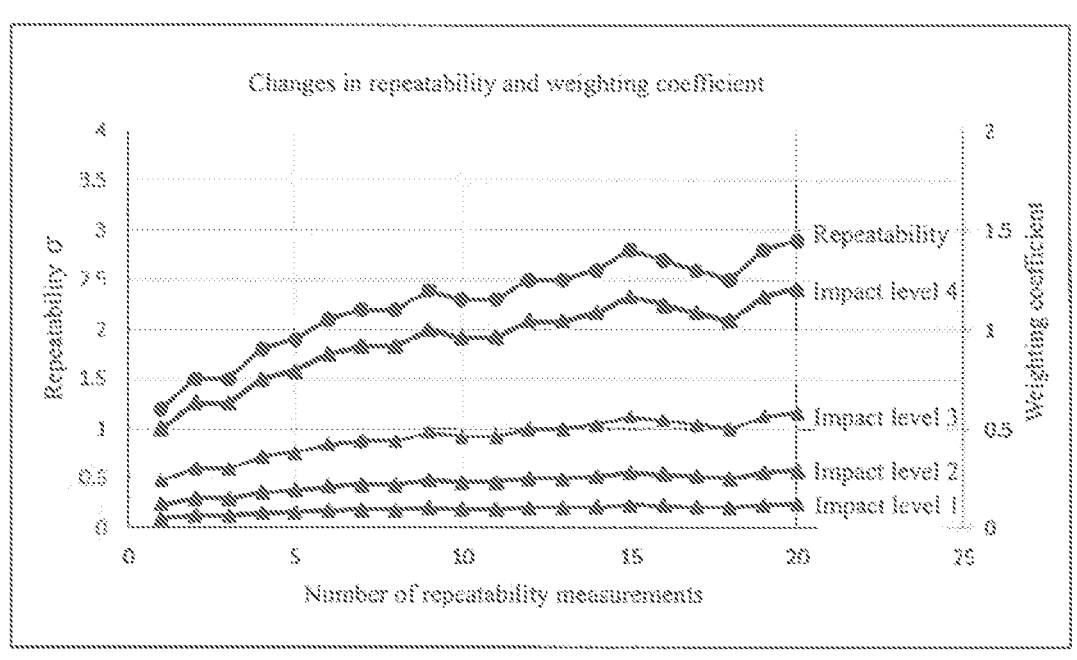
FIG. 14 is a diagram illustrating changes in repeatability and weighting coefficient in the second embodiment.

FIG. 14 is a diagram illustrating changes in repeatability and weighting coefficient in the second embodiment. The horizontal axis represents the number of repeatability measurements, the left-side vertical axis represents the repeatability (σ), and the right-side vertical axis represents the weighting coefficient (K). This way, by using the weighing apparatus 1 of the present embodiment, the weighting coefficient K that is a factor that affects the failure risk level R is course-corrected in line with the tendency of repeatability. Therefore, when the repeatability deteriorates, counting-up of the failure risk level R becomes quicker, and an inspection proposal is also quickly presented to a user. On the other hand, when the repeatability is improved, counting-up of the failure risk level R becomes slower, and the proposal is adjusted so as to match the actual state of the apparatus. As the repeatability, without limitation to the repeatability of the weighed value, the repeatability calculated from a zero point, etc., may be used.

Third Embodiment (Apparatus Configuration)

A third embodiment is applicable to both of the first and second embodiments. Description will be given by using an example of application to the first embodiment. In the third embodiment, after execution of a proposed inspection content (after a performance check), a "wait-and-see" period is provided.

Figure 15:
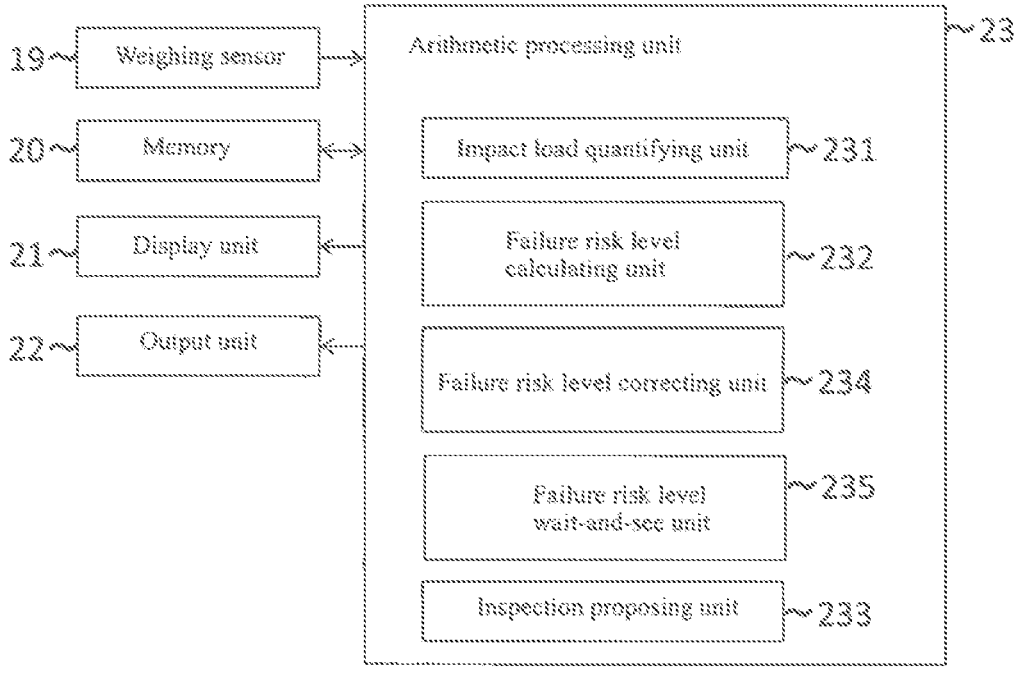
FIG. 15 is a configuration block diagram of a weighing apparatus according to a third embodiment of the present invention.

FIG. 15 is a configuration block diagram of a weighing apparatus 1 according to the third embodiment. The weighing apparatus 1 of the present embodiment includes the weighing sensor 19, the memory 20, the display unit 21, the output unit 22, and the arithmetic processing unit 23, and further, the arithmetic processing unit 23 includes a failure risk level wait-and-see unit 235. The function of the failure risk level wait-and-see unit 235 will be described in detail next.

(Inspection Content Proposing Method)

Figure 16:
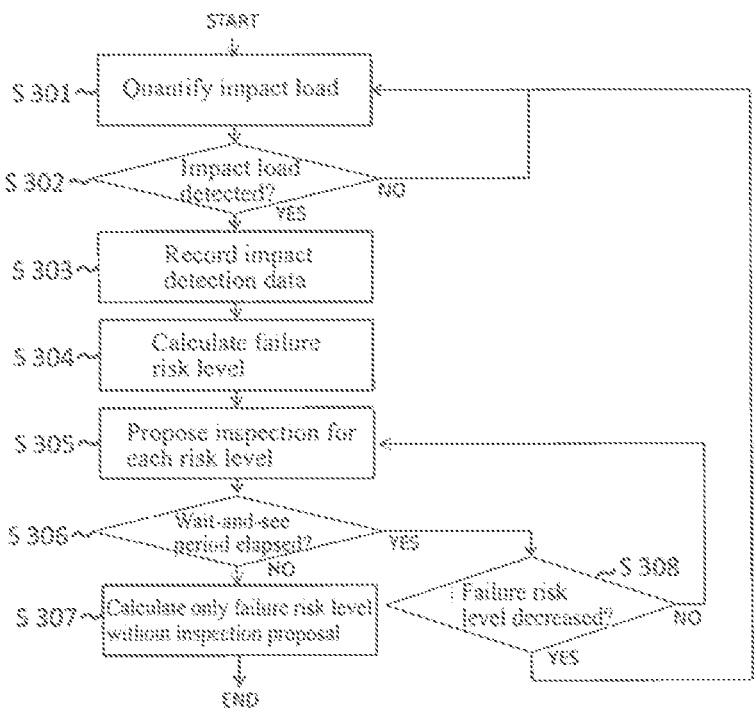
FIG. 16 is a flowchart of an inspection content proposing method according to the third embodiment.

FIG. 16 is a flowchart of an inspection content proposing method according to the third embodiment. Steps S301 to S305 according to this embodiment are the same as Steps S101 to S105 of the first embodiment. That is, the impact load quantifying unit 231 quantifies an impact load in Step S301, the failure risk level calculating unit 232 calculates an impact level in Step S302, and accumulates impact detection data in Step S303, the failure risk level calculating unit 232 calculates a failure risk level R in Step S304, and then, the processing shifts to Step S305, and the inspection proposing unit 233 proposes an inspection content according to the risk level to a user.

In this embodiment, after execution of the proposal (performance check) in Step S305 of the first flow, from the next flow, the processing shifts to Step S306. In Step S306, the failure risk level wait-and-see unit 235 functions and judges whether a wait-and-see period has elapsed. The wait-and-see period may be arbitrarily set by a user, and it is preferable to wait and see for, for example, one week or so.

When it is during the wait-and-see period (NO), the processing shifts to Step S307, and while continuing the calculation of the failure risk level R, the failure risk level wait-and-see unit 235 waits and sees without presenting an inspection proposal in this period. On the other hand, after the wait-and-see period elapses (YES), the processing shifts to Step S308, and whether the current failure risk level R has decreased as compared to a failure risk level R before the wait-and-see period is judged. When the level has decreased (YES), the processing returns to Step S301 and monitoring of the failure risk is continued. When the level has increased (NO), the processing returns to Step S305, and a user is prompted to execute an inspection corresponding to the current failure risk level R again.

This way, by using the weighing apparatus 1 of the present embodiment, the "wait-and-see" period is provided after execution of a performance check, and accordingly, a result of the performance check can be reflected in counting-up of the failure risk level R.

Fourth Embodiment (Apparatus Configuration)

A fourth embodiment is applicable to any of the first to third embodiments. Description is given by using an example of application to the first embodiment. In the fourth embodiment, making proposals according to failure risk levels is combined with the functions of "daily inspection" and "periodic inspection" that a balance commonly has.

Figure 17:
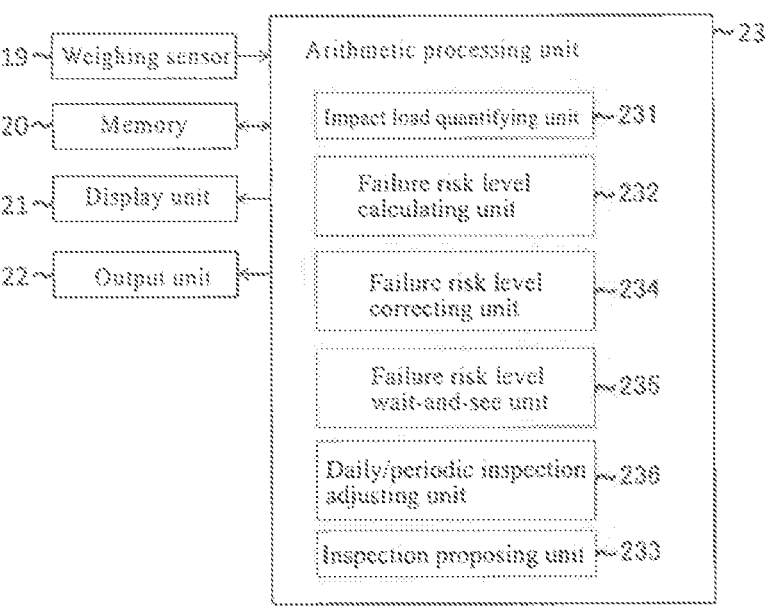
FIG. 17 is a configuration block diagram of a weighing apparatus according to a fourth embodiment of the present invention.

FIG. 17 is a configuration block diagram of a weighing apparatus 1 according to the fourth embodiment. The weighing apparatus 1 of the present embodiment includes the weighing sensor 19, the memory 20, the display unit 21, the output unit 22, and the arithmetic processing unit 23, and further, the arithmetic processing unit 23 includes a daily/periodic inspection adjusting unit 236. The function of daily/periodic inspection adjusting unit 236 will be described in detail next.

(Inspection Content Proposing Method)

Figure 18:
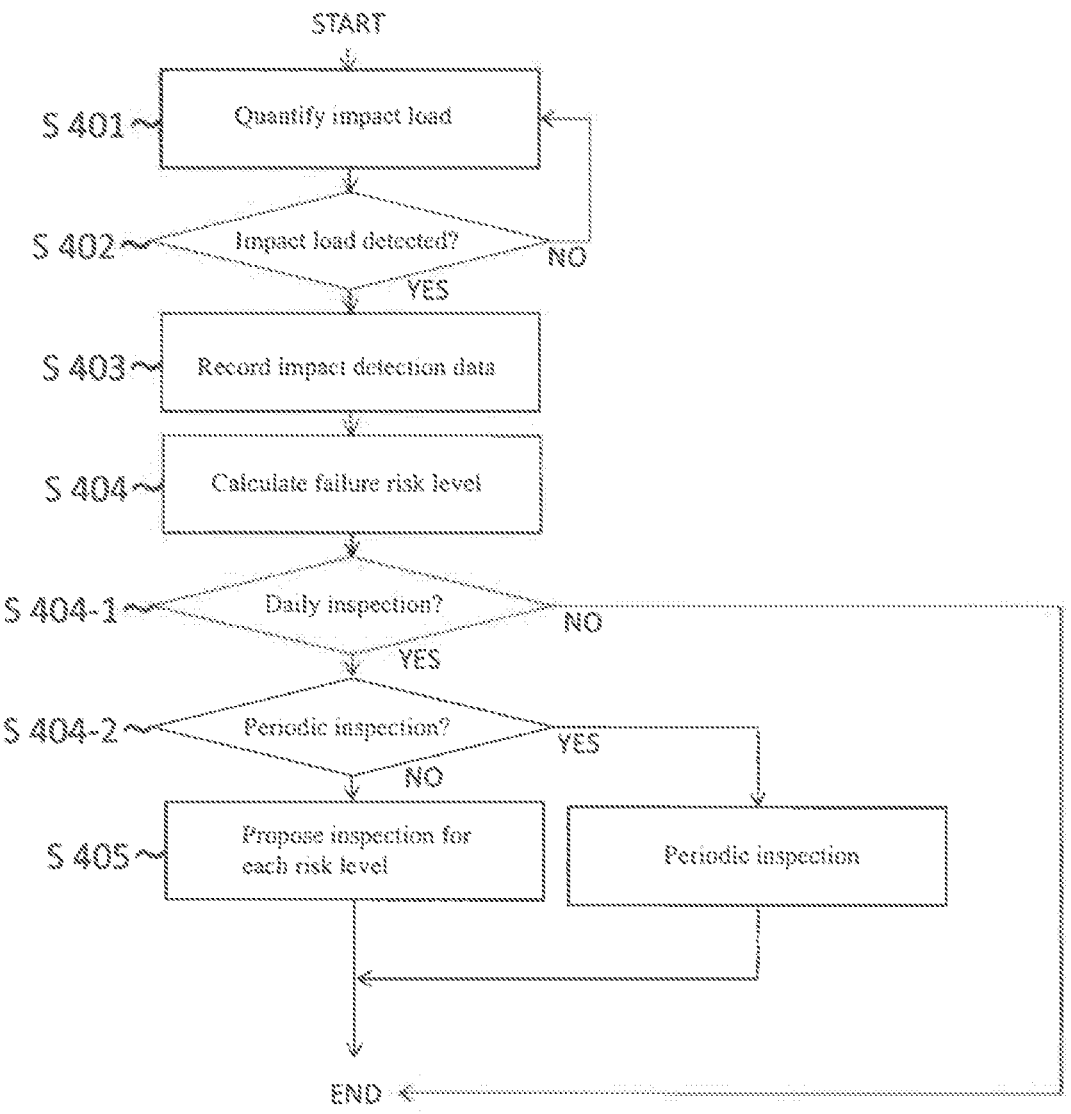
FIG. 18 is a flowchart of an inspection content proposing method according to the fourth embodiment.

FIG. 18 is a flowchart of an inspection content proposing method according to the fourth embodiment. Steps S401 to S404 according to the present embodiment are the same as Steps S101 to S104 of the first embodiment. That is, the impact load quantifying unit 231 quantifies an impact load in step S401, the failure risk level calculating unit 232 calculates an impact level in Step S402, and accumulates impact detection data in Step S403, and the failure risk level calculating unit 232 calculates a failure risk level R in Step S404.

In the present embodiment, next, the processing shifts to Step S404-1, and the daily/periodic inspection adjusting unit 236 judges whether the current date and time are a date and time to execute a daily inspection set in "Daily inspection." When the current date and time are not the daily inspection date and time (NO), no proposal is made. When the current date and time are the daily inspection date and time (YES), the processing shifts to Step S404-2, and whether the current date and time are a date and time to execute a periodic inspection set in "Periodic inspection" is judged. When the current date and time are not the periodic inspection date and time (NO), the processing shifts to Step S405, and shifts to a flow to make a proposal according to a failure risk level illustrated in FIG. 7. When the current date and time are the periodic inspection date and time (YES), a user is prompted to execute an item of the periodic inspection.

This way, by using the weighing apparatus 1 of the present embodiment, which is configured to notify a user of a current failure risk level at a timing of the daily inspection and propose an inspection content according to the risk level, the functions of "daily inspection" and "periodic inspection" that a balance commonly has and making proposals according to failure risk levels are integrated well together. In the daily inspection, a user is presented with a current failure risk and what to do for making an improvement to reduce the risk, and is guided so as to execute an inspection for the improvement.

Preferred embodiments and modifications of the present invention have been described above, and the embodiments and modifications can be combined based on the knowledge of a person skilled in the art, and such a combined embodiment is also included in the scope of the present invention. The expression "failure risk" is just an example, and even when expressions such as "failed state" or "handling situation" of a balance are used, these are also included in the scope of the present invention.

REFERENCE SIGNS LIST

1: Weighing apparatus
14: Beam (load transmitting unit)
19: Weighing sensor
20: Memory
21: Display unit
22: Output unit
23: Arithmetic processing unit
231: Impact load quantifying unit
232: Failure risk level calculating unit
233: Inspection proposing unit
234: Failure risk level correcting unit
235: Failure risk level wait-and-see unit
236: Daily/periodic inspection adjusting unit

The invention claimed is:

1. A weighing apparatus configured to calculate a failure risk based on an impact load, comprising:
   a member that is displaced in response to a load applied by a weighing object;
   a weighing sensor that generates an electrical signal indicative of a weighed value of the weighing object;
   a displacement detection sensor that generates an electrical signal indicative of an amount of displacement of the displaced member;
   a microcontroller having a CPU that receives the electrical signal generated by the weighing sensor and the displacement detection sensor, and that includes
      an impact load quantifying circuit configured to quantify an impact load from the electrical signal received from the displacement detection sensor;
      a failure risk level calculating circuit configured to calculate an impact level based on a numerical value of the impact load, and calculate a failure risk level from the number of detections of the impact level in a predetermined period of time from past to present and a weighting coefficient according to the impact level, and
      a failure risk level correcting circuit configured to adjust the magnitude of the weighting coefficient according to a change in repeatability related to the weighed value.

2. The weighing apparatus according to claim 1, wherein the microcontroller further comprises an inspection proposing circuit configured to propose an inspection according to a magnitude of the failure risk level to a user.

3. The weighing apparatus according to claim 2, wherein the microcontroller further comprises a failure risk level wait-and-see circuit configured to judge whether a wait-and-see period has elapsed after execution of the proposal, and configured not to present a proposal by the inspection proposing circuit during the wait-and-see period.

4. The weighing apparatus according to claim 3, further comprising a daily/periodic inspection adjusting circuit configured to judge whether a current date and time are a daily inspection date and time and a periodic inspection date and time, and when the current date and time are the daily inspection date and time and not the periodic inspection date and time, present a proposal by the inspection proposing circuit.

5. The weighing apparatus according to claim 2, wherein the microcontroller further comprises a daily/periodic inspection adjusting circuit configured to judge whether a current date and time are a daily inspection date and time and a periodic inspection date and time, and when the current date and time are the daily inspection date and time and not the periodic inspection date and time, present a proposal by the inspection proposing circuit.

6. The weighing apparatus according to claim 1, wherein the failure risk level calculating circuit is configured to calculate the failure risk level R from a numerical formula (1), provided that N is the number of detections, K is the weighting coefficient, r is the impact level, n is a maximum value of the impact level, T is a current date and time, and t is the predetermined period of time $$R = \sum_{r=1}^{r=n}\left(\sum_{T-t}^{T}(N \times K)\right)$$ [Numerical Formula 1]

7. The weighing apparatus according to claim 1, wherein the failure risk level correcting circuit is configured to adjust the weighting coefficient (K) from a numerical formula (2) and a numerical formula (3), provided that C is an adjustment amount of the weighting coefficient K, and B is a change rate of the repeatability $$K=K+C$$ [Numerical Formula 2]

$$C=B \times K$$ [Numerical Formula 3].

8. The weighing apparatus according to claim 1, wherein the microcontroller further comprises a failure risk level wait-and-see circuit configured to judge whether a wait-and-see period has elapsed after execution of the proposal, and configured not to present a proposal by the inspection proposing circuit during the wait-and-see period.

9. The weighing apparatus according to claim 1, further comprising a daily/periodic inspection adjusting circuit configured to judge whether a current date and time are a daily inspection date and time and a periodic inspection date and time, and when the current date and time are the daily inspection date and time and not the periodic inspection date and time, present a proposal by the inspection proposing circuit.

10. An inspection content proposing method of a weighing apparatus having a member that is displaced in response to a load applied by a weighing object, a weighing sensor that generates an electrical signal indicative of a weighed value of a weighing object, a displacement detection sensor that generates an electrical signal indicative of an amount of displacement of the displaced portion, a microcontroller that includes an impact load quantifying circuit, a failure risk level calculating circuit, and a failure risk level correcting circuit, comprising the steps of:

quantifying an impact load from the electrical signal generated by the displacement detection sensor;

calculating an impact level based on a numerical value of the impact load and calculating a failure risk level from the number of detections of the impact level in a predetermined period of time from past to present and a weighting coefficient according to the impact level;

proposing an inspection content according to a magnitude of the failure risk level to a user; and correcting the failure risk level by adjusting the magnitude of the weighing coefficient according to a change in repeatability related to the weighed value.

* * * * *